United States Patent [19]

Drent et al.

[11] Patent Number: 5,215,647
[45] Date of Patent: Jun. 1, 1993

[54] OIL COMPOSITIONS

[75] Inventors: Eit Drent; Marinus J. Reynhout; Henricus P. M. Tomassen, all of Amsterdam, Netherlands

[73] Assignee: Shell Oil Company, Houston, Tex.

[21] Appl. No.: 728,488

[22] Filed: Jul. 11, 1991

[30] Foreign Application Priority Data

Jul. 25, 1990 [NL] Netherlands ............................ 9001691

[51] Int. Cl.$^5$ .......................................... C10M 145/04
[52] U.S. Cl. ...................................... 208/14; 528/392; 106/285; 252/52 R
[58] Field of Search ........................ 528/392; 106/285; 208/14; 252/52 R

[56] References Cited

U.S. PATENT DOCUMENTS

| | | | |
|---|---|---|---|
| 2,495,292 | 1/1950 | Scott | 528/392 |
| 3,694,412 | 9/1972 | Nozaki | 260/63 |
| 4,761,453 | 8/1988 | Allen | 524/612 |
| 4,818,810 | 4/1989 | Drent | 528/392 |
| 4,824,934 | 4/1989 | Van Broekhoven et al. | 528/392 |
| 4,835,250 | 5/1989 | Drent | 528/392 |

FOREIGN PATENT DOCUMENTS

| | | |
|---|---|---|
| 121965 | 8/1984 | European Pat. Off. . |
| 181014 | 9/1985 | European Pat. Off. . |
| 235865 | 2/1987 | European Pat. Off. . |
| 322018 | 12/1988 | European Pat. Off. . |
| 337521 | 3/1989 | European Pat. Off. . |
| 376364 | 11/1989 | European Pat. Off. . |
| 393753 | 4/1990 | European Pat. Off. . |
| 1305048 | 6/1961 | France ............... 528/392 |

*Primary Examiner*—David Brunsman

[57] ABSTRACT

Hydrocarbon oil compositions of improved low temperature properties comprise intimate mixtures of hydrocarbon oil and a linear alternating polymer of carbon monoxide and at least one straight-chain α-olefin of relatively high carbon number.

10 Claims, No Drawings

OIL COMPOSITIONS

FIELD OF THE INVENTION

This invention relates to novel oil compositions comprising a hydrocarbon oil and a novel polymeric additive. More particularly, the invention relates to hydrocarbon oil compositions containing a novel linear alternating polymer of carbon monoxide and at least one α-olefin of relatively high carbon number.

BACKGROUND OF THE INVENTION

The class of linear alternating polymers of carbon monoxide and at least one ethylenically unsaturated hydrocarbon has been known for some time. Nozaki, e.g., U.S. Pat. No. 3,694,412, produced such polymers in the presence of arylphosphine complexes of palladium moieties and certain inert solvents. More recently, production of the linear alternating polymers has been illustrated by a number of published European Patent Applications including Nos. 121,965 and 181,014. The polymer production typically involves contacting the reactants under polymerization conditions in the presence of a catalyst composition formed from a compound of palladium, the anion of a strong non-hydrohalogenic acid and a bidentate ligand of phosphorus. These polymers, now known as polyketones or polyketone polymers, have established utility as premium thermoplastics. They are processable by conventional procedures such as injection molding and thermoforming into a variety of shaped articles of recognized utility. Many polyketones are produced from ethylenically unsaturated hydrocarbons of relatively low molelular weight, e.g., ethylene or propylene. However, published European Patent Application 235,865 shows production of copolymers of carbon monoxide and n-octene-1 and terpolymers of carbon monoxide, ethylene and n-dodecene-1.

It is also well known that hydrocarbon oils such as gas oils, diesel oils, lubricating oils and most crude oils contain considerable quantities of paraffin. When these paraffinic oils are used or processed at low temperatures, difficulties can and do arise because of the crystallization of the paraffins in the hydrocarbon oil. In order to obviate these difficulties, it is customary to include within the oil a polymeric additive, often a high molecular weight polymer of ethylene and vinyl acetate. These polymers tend to lower the pour point, the cloud point and the cold filter plugging point of the hydrocarbon oil and facilitate the use, storage or transportation of the oil. Thus, these ethylene/vinyl acetate polymers do improve the low temperature properties of the hydrocarbon oils, and indeed some are commercially accepted for these purposes. However, it would be of advantage to provide new hydrocarbon oil compositions containing other polymeric additives, which compositions have improved low temperature properties.

SUMMARY OF THE INVENTION

The present invention provides certain novel hydrocarbon oil compositions of improved low temperature properties. More particularly, the present invention provides hydrocarbon oil compositions comprising hydrocarbon oil and a novel linear alternating polymer of carbon monoxide and at least one of certain ethylenically unsaturated hydrocarbon.

DESCRIPTION OF THE INVENTION

The hydrocarbon oil compositions of the invention are miscible mixtures of a hydrocarbon oil such as gas oil, diesel oil, lubricating oil or crude oil and linear alternating polymer of carbon monoxide and at least one straight-chain α-olefin of relatively high carbon number. The polymers are characterized by the presence of repeating units of the formula

wherein A is the moiety of straight-chain α-olefin of at least 10 carbon atoms, polymerized through the ethylenic linkage thereof. Preferred α-olefin precursors of the polymer component of the present compositions have from 10 to 40 carbon atoms inclusive, particularly from 10 to 30 carbon atoms, and are employed as single straight-chain α-olefin or as a mixture of two or more straight-chain α-olefins within this carbon number range. When a single α-olefin is employed in the production of the polymeric component, the term A in the above formula I will correspond to that α-olefin. When a mixture of two or more α-olefins is utilized in the preparation of the polyketone polymer, the term A represents each of the α-olefinic moieties, which moieties will be distributed randomly throughout the polymeric chain. Illustrative of such α-olefins are n-decene-1, n-dodecene-1, n-tetradecene-1, n-octadecene-1, n-nonadecene-1 and corresponding straight-chain α-olefins of twenty to forty carbon atoms, as well as mixtures thereof. Individual even-numbered straight-chain α-olefins in the twelve to eighteen carbon atom range are readily available as are mixtures of at least two of the α-olefins and are particularly preferred α-olefins as are mixtures of $C_{20}$ to $C_{24}$ α-olefins.

The polymers utilized as the polymeric component of the compositions of the invention are produced by contacting the carbon monoxide and α-olefin under polymerization conditions in the presence of an aprotic reaction diluent and a catalyst composition formed from a compound of palladium, the anion of a strong non-hydrohalogenic acid and a bidentate ligand of phosphorus. Although the scope of the polymerization process is extensive, and without wishing to be limited, a preferred compound of palladium is a palladium carboxylate and palladium acetate, palladium propionate and palladium butyrate are satisfactory. Palladium acetate is particularly preferred. The anion precursor of the catalyst composition is suitably the anion of a non-hydrohalogenic acid having a pH below about 6 and preferably below 2. Illustrative of such acids are inorganic acids such as sulfuric acid and perchloric acid and organic acids including carboxylic acids such as trichloroacetic acid, difluoroacetic acid, dichloroacetic acid and trifluoroacetic acid as well as sulfonic acids such as methanesulfonic acid, p-toluenesulfonic acid and trichloromethanesulfonic acid. The anion is provided in any convenient form. In one embodiment, the anion is provided in the form of the free acid. In a second embodiment, the anion is provided as a metal salt, particularly as a non-noble transition metal salt such as a copper salt or a nickel salt. In yet another embodiment, the palladium and the anion catalyst composition precursors are provided as a single compound, e.g., palladium trifluoroacetate. However provided, the anion is employed in a quantity from about 1 mole to about 100 moles per mole of palladium. Quantities of anion from about 2 moles to about 50 moles per mole of palladium are preferred.

The bidentate ligand of phosphorus used to form the catalyst composition is represented by the formula

  (II)

wherein R independently is alkyl or aryl of up to 10 carbon atoms inclusive, preferably up to 6 carbon atoms inclusive, and R' is a divalent bridging group of up to 10 carbon atoms inclusive with from 2 to 4 carbon atoms in the bridge. Aryl R groups such as phenyl and tolyl are suitable but preferred R groups are hydrocarbyl alkyl groups such as methyl, propyl, butyl, hexyl, octyl and decyl. As the R group, n-butyl is particularly preferred. Alkylene R' groups such as 2,2-dimethyl-1,3-propylene and 1-methyl-1,3-propylene are satisfactory but preferred R' groups are polymethylene groups of the formula

  (III)

wherein n is an integer from 2 to 4 inclusive. Trimethylene or 1,3-propylene is particularly preferred. The bidentate phosphorus ligand 1,3-di(n-butylphosphino)-propane is particularly preferred as the bidentate ligand. The quantity of bidentate phosphine ligand provided to the catalyst composition is suitably from about 0.5 mole to about 2 moles per mole of palladium. Quantities of ligand from about 0.75 mole to about 1.5 mole per mole of palladium are preferred.

It is useful on some occasions to employ an organic oxidizing agent in order to promote catalyst composition activity. Suitable organic oxidants include aliphatic nitrites such as butyl nitrite or amyl nitrite and aryl nitro compounds such as nitrobenzene or nitrotoluene. Preferred oxidizing agents, however, are hydroquinones, both 1,2- and 1,4-hydroquinones. Illustrative of such are benzoquinone, naphthoquinone and anthraquinone. Naphthoquinone is preferred, particularly 1,4-naphthoquinone. No oxidizing agent is required but amounts of oxidizing agent up to 5000 moles per mole of palladium are satisfactory. When oxidizing agent is present, quantities from about 10 moles to about 1000 moles per mole of palladium are preferred.

The polymerization process is conducted by contacting the carbon monoxide and olefin reactants under polymerization conditions in the presence of an aprotic reaction diluent and the catalyst composition. Molar ratios of carbon monoxide to straight-chain α-olefin from about 10:1 to about 1:10 are useful, but molar ratios from about 5:1 to about 1:5 are preferred. The aprotic reaction diluent to be employed is a substantially aprotic reaction diluent containing at least about 90% by volume of aprotic diluent with no more than about 10% by volume of protic diluent mixed therewith. Illustrative aprotic diluents include the alkanones such as acetone, methyl ethyl ketone and diethyl ketone; ethers including cyclic ethers such as tetrahydrofuran and dioxane as well as acyclic ethers such as the dimethyl ether of diethylene glycol and the diethyl ether of ethylene glycol; hydrocarbons such as benzene and heptane or even the long chain α-olefin serving as the reactant monomer; lactones such as butyrolactone; lactams such as N-methyl-2-pyrrolidone and sulfur compounds such as sulfolane and dimethylsulfoxide. Best results are obtained when a small quantity protic reaction diluent is present, i.e., present in no more than about 10% by volume, and alkanols such as methanol or ethanol are useful for this purpose.

The catalyst composition is employed in a catalytic quantity. Amounts of catalyst composition sufficient to provide from about $1 \times 10^{-7}$ mole to about $1 \times 10^{-3}$ mole of palladium per mole of olefin to be polymerized are satisfactory although quantities of catalyst composition sufficient to provide from about $1 \times 10^{-6}$ mole to about $1 \times 10^{-4}$ mole of palladium per mole of olefin to be polymerized are preferred. Typical polymerization conditions include a polymerization temperature of from about 25° C. to about 150° C. but polymerization temperatures from about 30° C. to about 130° C. are preferred. The suitable polymerization pressures include pressures from about 2 bar to about 150 bar although pressures from about 5 bar to about 100 bar are preferred.

The contact of reactants and catalyst composition is facilitated by known methods such as shaking or stirring and subsequent to reaction the polymerization is terminated by cooling the reaction mixture and releasing the pressure. The polymer is typically obtained as a product substantially insoluble in the reaction diluent and is recovered by conventional methods such as filtration or decantation. The polymer product is employed in the compositions of the invention as recovered or is purified as by contact with a solvent or extractant which is selective for catalyst residues.

To produce the hydrocarbon compositions of the invention, the novel linear alternating polymer additive is intimately mixed with the hydrocarbon oil. Of particular interest are the polymers having a weight average molecular weight from about $1 \times 10^3$ to about $1 \times 10^6$. Such linear alternating polymers dissolve in the hydrocarbon oil on mixing of suitable proportions of the composition components. Amounts of linear alternating polymer from about 1 mg to about 10,000 mg of polymer per kg of hydrocarbon oil give good results. Amounts of polymer from about 10 mg to about 1000 mg of polymer per kg of hydrocarbon oil are preferred.

The compositions of the invention are characterized by improved low temperature properties and particularly by reduced pour point, cloud point and cold filter plugging point as compared with the hydrocarbon oil component of the composition. The linear alternating polymer additives of the invention provide better reduction of such properties as compared with equal concentrations of conventional additives or equivalent lowering of such properties at lower concentrations. Thus, the presence of the additives facilitates better transportation, use and storage of hydrocarbon oils at low temperature.

The invention is further illustrated by the following Illustrative Embodiments which should not be construed as limiting. The molecular weight of each of the polymers produced in Illustrative Embodiments I-IX was determined by gas chromatographic analysis. In the case of each of these polymers, $^{13}$C-NMR analysis indicated that the polymer was linear and had alternating units of carbon monoxide and α-olefin. In the case of polymers produced from more than one α-olefin, the polymer contained units of both α-olefins, in random order, alternating with moieties derived from the carbon monoxide.

ILLUSTRATIVE EMBODIMENT I

A copolymer of carbon monoxide and n-tetradecene-1 was prepared by charging to an autoclave of 250 ml capacity, equipped with a mechanical stirrer, 100 ml of tetrahydrofuran and 40 ml of n-tetradecene-1, under a nitrogen atmosphere. A catalyst composition solution was then added which comprised 5 ml of methanol, 0.1 mmol of palladium acetate, 0.5 mmol of nickel perchlorate, 0.12 mmol of 1,3-bis(di-n-butylphosphino)propane and 6 mmol of naphthoquinone. After pressurizing the autoclave to a pressure of 40 bar, the autoclave and contents were heated to 35° C. and maintained at that temperature for 20 hours. The polymerization was then terminated by cooling the autoclave and contents to ambient temperature and releasing the pressure. Acetone was added to the product mixture and the polymer product was recovered by filtration, washed with acetone and dried. The yield of copolymer was 40 g and the copolymer had a weight average molecular weight of 103,000.

ILLUSTRATIVE EMBODIMENT II

A copolymer of carbon monoxide and n-octadecene-1 was produced by a method substantially similar to that of Illustrative Embodiment I except that 40 ml of n-octadecene-1 was used instead of the n-tetradecene-1, the reaction temperature was 50° C. instead of 35° C. and the reaction time was 30 hours instead of 20. The yield of copolymer was 40 g and the copolymer had a weight average molecular weight of 20,300.

ILLUSTRATIVE EMBODIMENT III

A copolymer of carbon monoxide and n-hexadecene-1 was produced by a method substantially similar to that of Illustrative Embodiment I except that 40 ml of n-hexadecene-1 was used in place of the n-tetradecene-1 and the reaction temperature was 50° C. instead of 35° C. The yield of copolymer was 35 g and the copolymer had a weight average molecular weight of 20,000.

ILLUSTRATIVE EMBODIMENT IV

A terpolymer of carbon monoxide, n-tetradecene-1 and n-octadecene-1 was produced by a procedure substantially similar to that of Illustrative Embodiment I except that 30 ml of n-tetradecene-1 were used instead of 40 ml and the autoclave additionally contained 30 ml of n-octadecene-1. The yield of terpolymer was 41 g and the terpolymer had a weight average molecular weight of 78,000.

ILLUSTRATIVE EMBODIMENT V

A polymer of carbon monoxide, n-tetradecene-1, n-hexadecene-1 and n-octadecene-1 was prepared by a procedure substantially similar to that of Illustrative Embodiment I except that 40 ml of a 1:2:1 molar mixture of n-tetradecene-1, n-hexadecene-1 and n-octadecene-1 was used instead of the 40 ml of n-tetradecene-1, the carbon monoxide was added to give a pressure of 40 bar, the reaction temperature was 50° C. instead of 35° C. and the reaction time was 15 hours instead of 20 hours. The yield of polymer was 42 g and the polymer had a weight average molecular weight of 22,150.

ILLUSTRATIVE EMBODIMENT VI

A polymer of carbon monoxide and α-olefin was prepared wherein the α-olefin was a mixture of $C_{20}$–$C_{24}$ α-olefins. The polymer was produced by a procedure substantially similar to that of Illustrative Embodiment I except that 40 g of the mixed α-olefin were used instead of n-tetradecene-1, carbon monoxide was added to give a pressure of 70 bar instead of 40 bar, the reaction temperature was 50° C. instead of 35° C., and the reaction time was 15 hours instead of 20 hours. The yield of polymer was 38 g and the polymer had a weight average molecular weight of 22,700.

ILLUSTRATIVE EMBODIMENT VII

A polymer of carbon monoxide, n-dodecene-1, n-tetradecene-1, n-hexadecene-1 and n-octadecene-1 was produced by a method substantially similar to that of Illustrative Embodiment I, except that 50 ml of a 1:2:2:1 molar mixture of n-dodecene-1, n-tetranecene-1, n-hexadecene-1 and n-octadecene-1 was used in place of the 40 ml of n-tetradecene-1, the reaction temperature was 50° C. instead of 35° C., and the reaction time was 15 hours instead of 20 hours. The yield of polymer was 40 g and the polymer had a weight average molecular weight of 28,600.

ILLUSTRATIVE EMBODIMENT VIII

A polymer of carbon monoxide, n-dodecene-1, n-tetradecene-1, n-hexadecene-1 and n-octadecene-1 was prepared by a procedure substantially similar to that of Illustrative Embodiment VII except that the molar ratio of α-olefins was 2:1:1:2 instead of 1:2:2:1. The yield of polymer was 42 g and the polymer had a weight average molecular weight of 26,100.

ILLUSTRATIVE EMBODIMENT IX

A copolymer of carbon monoxide and n-hexadecene-1 was prepared by a procedure substantially similar to that of Illustrative Embodiment I except that 100 ml of n-nexadecene-1 was used instead of the tetrahydrofuran and n-tetradecene-1, carbon monoxide was added to give a pressure of 70 ml instead of 40 ml, the reaction temperature was 50° C. instead of 35° C., and the reaction time was 15 hours instead of 20 hours. The yield of copolymer was 45 g and the copolymer had a number average molecular weight of 35,400.

ILLUSTRATIVE EMBODIMENT X

A number of the polymers produced in Illustrative Embodiments I–IX were evaluated as additives in three gas oils (A, B and C) to determine the effect of each additive evaluated on the pour point (PP), cloud point (CP) and/or cold filter plugging point (DFPP) of these oils. The additives employed were the following.

Additive 1—The polymer produced according to Illustrative Embodiment I.

Additive 2—The polymer produced according to Illustrative Embodiment III.

Additive 3—The polymer produced according to Illustrative Embodiment IV.

Additive 4—A mixture of the polymers prepared in Illustrative Embodiment I and III in a weight ratio of 1:1.

Additive 5—A mixture of polymers prepared in Illustrative Embodiments I and III, used in a 1:3 weight ratio.

For comparison, four additives commercially available for these purposes were also evaluated. These commercially available additives were the following:

Additive 6—PARAMIN® ECA 5920
Additive 7—PARAMIN® ECA 8182
Additive 8—PARAMIN® ECA 8400
Additive 9—PARAFLOW® 214.

In each evaluation, the additive was introduced to the gas oil as a 50% by weight solution in an organic solvent. The results of the evaluations are shown in Tables I–III.

TABLE I

| Additive | Additive Solution, ml/kg gas oil | Gas Oil A CP, °C., ASTM D 2500 | PP, °C. ASTM D 97 | CFPP, °C. IP 309 |
|---|---|---|---|---|
| None | — | 2 | −12 | −9 |
| 6 | 100 | | | −15 |
| 6 | 200 | | | −6 |
| 6 | 300 | | | −6 |
| 6 | 400 | | | −18 |
| 6 | 600 | 0 | | |
| 6 | 1000 | −1 | | |
| 2 | 100 | | −18 | −19 |
| 2 | 200 | | −24 | |
| 2 | 600 | −0.5 | −24 | |
| 2 | 1000 | −1.5 | | |
| 3 | 40 | | | −19 |
| 3 | 400 | | | −24 |
| 4 | 100 | | | −17 |
| 4 | 150 | | | −20 |
| 4 | 300 | | | −22 |
| 5 | 2000 | | −42 | |
| 6 | 2000 | | −39 | |
| 7 | 100 | 2 | −12 | |
| 7 | 200 | 2 | −15 | |
| 7 | 600 | 2 | −18 | |
| 7 | 1000 | 1 | −24 | |
| 8 | 100 | 1.5 | | |
| 8 | 200 | 1.5 | | |
| 8 | 600 | 1 | | |
| 8 | 1000 | 0.5 | | |
| 9 | 100 | | −12 | −13 |
| 9 | 200 | | −15 | −18 |

TABLE II

| Additive | Additive Solution, ml/kg gas oil | Gas Oil B CP, °C., ASTM D 2500 | PP, °C. ASTM D 97 | CFPP, °C. IP 309 |
|---|---|---|---|---|
| None | — | 1 | −15 | −9 |
| 6 | 100 | | −21 | −17 |
| 6 | 400 | | −27 | — |
| 6 | 600 | | −30 | −18 |
| 6 | 4000 | | −30 | −6 |
| 2 | 100 | | −24 | −17 |
| 2 | 400 | | −30 | |
| 2 | 4000 | | −36 | |
| 4 | 100 | | −24 | |
| 4 | 4000 | | −51 | −13 |
| 3 | 200 | | | −20 |
| 3 | 400 | | | −22 |

TABLE III

| Additive | Additive Solution, ml/kg gas oil | Gas Oil C CP, °C., ASTM D 2500 | PP, °C. ASTM D 97 | CFPP, °C. IP 309 |
|---|---|---|---|---|
| None | — | 0 | −18 | −5 |
| 6 | 75 | | | −5 |
| 6 | 300 | | | −6 |
| 2 | 150 | | | −11 |
| 1 | 150 | | | −15 |
| 1 | 300 | | | −17 |
| 4 | 150 | | | −18 |
| 3 | 75 | | | −13 |
| 3 | 600 | | −27 | |

What is claimed is:

1. A hydrocarbon oil composition comprising a paraffinic hydrocarbon oil and a linear alternating polymer of carbon monoxide and at least one straight-chain α-olefin of from 10 to 40 carbon atoms inclusive.

2. The composition of claim 1 wherein the polymer has a weight average molecular weight of from about $1 \times 10^3$ to about $1 \times 10^6$.

3. The composition of claim 2 wherein the α-olefin has from 10 to 30 carbon atoms inclusive.

4. The composition of claim 3 wherein the concentration of polymer in the hydrocarbon oil is from about 1 mg to about 10,000 mg of polymer per kg of hydrocarbon oil.

5. The composition of claim 4 wherein the olefin is a mixture of $C_{20}$ to $C_{24}$ α-olefins.

6. The composition of claim 4 wherein the α-olefin is n-dodecene-1, n-tetradecene-1, n-hexadecene-1 or n-octadecene-1 or mixtures thereof.

7. The composition of claim 6 wherein the α-olefin is n-tetradecene-1.

8. The composition of claim 6 wherein the α-olefin is n-hexadecene-1.

9. The composition of claim 6 wherein the α-olefin is n-octadecene-1.

10. The composition of claim 6 wherein the α-olefin is a mixture of at least two of n-tetradecene-1, n-hexadecene-1 and n-octadecene-1.

* * * * *